(12) United States Patent
Watson et al.

(10) Patent No.: US 7,167,315 B2
(45) Date of Patent: Jan. 23, 2007

(54) APPARATUS AND METHOD FOR COMBINING MULTIPLE ELECTROMAGNETIC BEAMS INTO A COMPOSITE BEAM

(75) Inventors: Mathew D. Watson, Bellevue, WA (US); Mark Freeman, Snohomish, WA (US)

(73) Assignee: Microvision, Inc., Redmond, WA (US)

( * ) Notice: Subject to any disclaimer, the term of this patent is extended or adjusted under 35 U.S.C. 154(b) by 0 days.

(21) Appl. No.: 10/828,876

(22) Filed: Apr. 20, 2004

(65) Prior Publication Data

US 2005/0231808 A1    Oct. 20, 2005

(51) Int. Cl.
*G02B 27/10* (2006.01)

(52) U.S. Cl. ..................... 359/634; 359/618
(58) Field of Classification Search ............... 359/618, 359/634, 636–638
See application file for complete search history.

(56) References Cited

U.S. PATENT DOCUMENTS

| 4,067,531 | A | | 1/1978 | Sikula |
| 4,394,853 | A | | 7/1983 | Lopez-Crevillen et al. |
| 5,045,983 | A | | 9/1991 | Shields |
| 5,767,924 | A | | 6/1998 | Hiroki et al. |
| 5,796,526 | A | * | 8/1998 | Anderson ............ 359/671 |
| 6,218,679 | B1 | | 4/2001 | Takahara et al. |
| 6,590,606 | B1 | | 7/2003 | Hiller et al. |
| 2001/0022566 | A1 | | 9/2001 | Okazaki |

FOREIGN PATENT DOCUMENTS

| DE | 36 06 052 A1 | 7/1986 |
| DE | 298 22 718 U1 | 5/1999 |
| EP | 0 657 639 A2 | 6/1995 |
| EP | 0 665 370 A1 | 8/1995 |
| EP | 0 811 761 A1 | 12/1997 |
| FR | 2 812 909 | 2/2002 |
| WO | WO 02/10855 A2 | 2/2002 |
| WO | WO 02/091077 A1 | 11/2002 |

OTHER PUBLICATIONS

Sony Corporation; Nichia and Sony Co-Develop New Dual Wavelength Laser Coupler Device Compatible with Red and Blue-Violet Lasers; New Single Integrated Device Offers Smaller Size and Greater Reliability to Convention Systems; Tokyo, Japan; Nov. 16, 2004.
International Search Report for PCT/US2005/013499 dated Jul. 18, 2005.

* cited by examiner

*Primary Examiner*—Hung Xuan Dang
*Assistant Examiner*—Joseph Martinez
(74) *Attorney, Agent, or Firm*—Christopher A. Wiklof; Graybeal Jackson Haley LLP

(57) ABSTRACT

A beam combiner includes a first beam-input face, a beam-output face, and first and second reflectors. The first beam-input face receives first and second beams of electromagnetic energy respectively having a first and second wavelengths. The first reflector reflects the first received beam toward the beam-output face, and the second reflector passes the first beam from the first reflector and reflects the received second beam toward the beam-output face. In one alternative, the first beam-input face also receives a third beam of electromagnetic energy having a third wavelength, the beam combiner includes a third reflector that reflects the received third beam toward the beam-output face, and the first and second reflectors pass the third beam from the third reflector. In another alternative, the beam combiner includes a second beam-input face that receives a third beam directed toward the beam-output face, and the first and second reflectors pass the third beam.

60 Claims, 8 Drawing Sheets

APPARATUS AND METHOD FOR COMBINING MULTIPLE ELECTROMAGNETIC BEAMS INTO A COMPOSITE BEAM

BACKGROUND OF THE INVENTION

Electronic color images, such as television images, are typically generated using three electromagnetic beams that each represent a different primary color. For example, a color-television screen typically includes an array of pixels that are each split into three phosphorescent regions: red (R), green (G), and blue (B). Three corresponding electron beams, one each for R, G, and B, are aligned such that they simultaneously strike the R, G, and B regions of the same pixels as the beams sweep across the screen. These beams cause the R, G, and B regions of a pixel to phosphoresce, and the human eye integrates the light generated by the phosphorescing R, G, and B regions of all the pixels to perceive a color image. By adjusting the respective intensities of the beams, the color television can generate a pixel having virtually any color. Alternatively, the R, G, and B beams can be light beams that the human eye perceives and integrates directly.

FIG. 1 is a diagram of an image generator 100 that scans a viewable color image onto a display area 102 of a retina or display screen using R, G, and B light beams 104, 106, and 108, which are aligned in a common horizontal plane. A scanning mirror 110, such as a microelectromechanical (MEM) mirror, sweeps the beams 104, 106, and 108 onto the area 102 to generate the image. Because the beams are horizontally aligned and separated by an angle θ, the contents of each beam is delayed relative to the other beams so that the beams form color pixels that are spatially aligned. For example, as the mirror 110 sweeps the beams from right to left, the B beam strikes a location P on the display area 102. As it strikes the location P, the B beam has the proper intensity for the blue component of the image pixel located at P. At some time later, the G beam strikes the location P. Therefore, the content of the G beam is delayed relative to the content of the B beam such that the G beam has the proper intensity for the green component of the pixel as it strikes the location P.

A problem with the image generator 100 is that its maximum image scan angle φ is 2θ less than the maximum image scan angle of a single-beam image generator (not shown). The maximum scan angle φ is the angle over which the mirror 110 can scan an image onto the display area 102. Specifically, the rightmost portion of the area 102 is defined by the rightmost position of the B beam, i.e., the position of the B beam when the mirror 110 is in its right most position. Likewise, the leftmost position of the area 102 is defined by the leftmost position of the R beam. When the B beam is in its rightmost position, and is thus at the rightmost edge of the area 102, the R beam is 2θ beyond the rightmost edge of the area 102. Likewise, when the R beam is in its leftmost position, and is thus at the leftmost edge of the area 102, the B beam is 2θ beyond the leftmost edge of the area 102. Consequently, 2θ of the sweep angle of the mirror 110 is wasted. That is, if the mirror 110 scanned only a single beam—the R beam for example—then φ would increase by 2θ. This 2θ reduction in the maximum scan angle φ may be significant in applications such as a virtual retinal display (VRD) where the maximum scan angle φ of the mirror is small to begin with.

To overcome the problem of a reduced scan angle in a multi-beam image generator such as the generator 100, one can combine the multiple beams into a single, composite beam.

FIG. 2 is a side view of a conventional beam combiner 200, often called an X-cube, which combines the R, G, and B light beams 104, 106, and 108 into a single composite beam 202. For clarity, the center rays of the R, G, and B beams are shown in solid line, and outer rays are shown in dash line. For purposes of illustration, the outer rays are presumed to be substantially parallel to the respective center rays.

The X-cube 200 is a combination of four right-angle prisms 204, 206, 208, and 210 having vertices that meet at the center axis 212 (in the Z dimension) of the X-cube and form two interfaces 214 (dash line) and 216 (solid line). Before the X-cube 200 is assembled, the internal prism faces that form the first interface 214 are treated with an optical coating that reflects red light but passes green and blue light. Similarly, the prism faces that form the second interface 216 are treated with an optical coating that that reflects blue light but passes green and red light. Furthermore, either before or after the X-cube 200 is assembled, the external faces 218, 220, 222, and 224 of the prisms 204, 206, 208, and 210 are polished to an optical finish since they respectively receive and project the R, G, B, and composite beams of light.

First, the operation of the X-cube 200 is discussed where the R, G, and B beams 104, 106, and 108 include only their single center rays (solid line). This discussion also applies to thin beams—such as beams that are a single pixel wide—that are much narrower than the faces 218, 220, 222, and 224 of the X-cube 200. That is, this discussion also applies to collimated beams that are neither converging toward a focus nor diverging as they pass through the X-cube 200. The R, G, and B beams 104, 106, and 108 enter the X-cube 200 at the respective faces 220, 218, and 222, and the X-cube projects the composite beam 202 from the face 222. Specifically, the G beam 106 propagates through the face 218 to the center axis 212, passes through the interfaces 214 and 216, and exits the face 222 as part of the composite beam 202. The R beam 104 propagates through the face 220 to the center axis 212, and is reflected out of the face 222 by the interface 214 as part of the composite beam 202. Similarly, the B beam 108 propagates through the face 224 to the center axis 212, and is reflected out of the face 222 by the interface 216 as part of the composite beam 202. As long as the prisms 204, 206, 208, and 210 are properly dimensioned and aligned, the composite beam 202 is a single ray, i.e., is no wider than the R, G, and B beams 104, 106, and 108.

Therefore, referring to FIG. 1, one can use the X-cube 200 to increase the maximum scan angle of the image generator 100. Specifically, one can use the X-cube 200 to combine single-pixel R, G, and B beams 104, 106, and 108 into a composite beam that the scanning mirror 110 can sweep across an angle of φ+2θ as discussed above in conjunction with FIG. 1.

Next, the operation of the X-cube 200 is discussed where the R, G, and B beams 104, 106, and 108 are wider than a single ray (dashed line), i.e., have diameters/widths that are on the order of the widths of the faces 218, 220, 222, and 224. For example, such wide R, G, and B beams may respectively include the R, G, and B components of an entire image as opposed to merely a single pixel of the image. The operation is similar to that described above for the narrow-beam case, but because the R, G, and B beams are wider, they intersect the interfaces 214 and 216 at regions that are centered about the center axis 212. Furthermore, the interfaces 214 and 216 reverse the R and B beams such that the R and B image components in the composite beam 202 are the "mirror images" of the R and B image components in the R and B beams. But this reversal can easily be accounted for by "reversing" the contents of the R and B beams before they enter the X-cube 200.

Image-projection devices, such as overhead projectors, often include an X-cube that operates in the wide-beam mode.

Still referring to FIG. 2, a problem with the X-cube 200 is that the internal faces of each prism 204, 206, 208, and 210 typically must be precision machined and assembled to a high degree of flatness and angle accuracy to allow proper interfacing of the prisms. For example, the center vertex of each prism must be substantially a right angle (90°), and the internal prism faces must be polished to be substantially optically flat so that there are no gaps between the interfaces 214 and 216. Furthermore, because each prism has two internal faces that respectively form portions of the two interfaces 214 and 216, each prism must be twice treated with the respective optical coatings that produce the interfaces. In addition, each prism may be treated a third time with an anti-reflective coating on the respective external faces 218, 220, 222, and 224. Moreover, the prisms must be precisely aligned during assembly to insure even interfaces 214 and 216. Unfortunately, the precision machining, multiple treatments, and precision assembly typically make the X-cube 200 relatively complex and expensive to manufacture.

Another problem is that for the X-cube 200 to function correctly, it may be necessary to rotate the polarization of the G beam 106 by 90° (relative to the polarization of the R and B beams) before it enters the X-cube. One way to accomplish this rotation is to insert a half-wave retarder (not shown) into the path of the G beam before it enters the face 218. Unfortunately, this may increase the cost of an image generator that includes the X-cube.

SUMMARY OF THE INVENTION

In one aspect of the invention, a beam combiner includes a first beam-input face, a beam-output face, and first and second reflectors. The first beam-input face receives first and second beams of electromagnetic energy respectively having a first and second wavelengths. The first reflector reflects the first received beam toward the beam-output face, and the second reflector passes the first beam from the first reflector and reflects the received second beam toward the beam-output face. In one alternative, the first beam-input face also receives a third beam of electromagnetic energy having a third wavelength, the beam combiner includes a third reflector that reflects the received third beam toward the beam-output face, and the first and second reflectors pass the third beam from the third reflector. In another alternative, the beam combiner includes a second beam-input face that receives a third beam directed toward the beam-output face, and the first and second reflectors pass the third beam.

Such a beam combiner can be less expensive than an X-cube because it is easier to manufacture. For example, the beam combiner often requires fewer precision cuts and has a less-stringent alignment tolerance because the most or all of the machining can be done after the combiner is assembled. Furthermore, the combiner can often be manufactured in bulk using off-the-shelf materials, thus further reducing the cost and manufacturing complexity.

In addition, such a beam combiner does not require the use of a half-wave retarder.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following discussion is presented to enable a person skilled in the art to make and use the invention. The general principles described herein may be applied to embodiments and applications other than those detailed below without departing from the spirit and scope of the present invention. The present invention is not intended to be limited to the embodiments shown, but is to be accorded the widest scope consistent with the principles and features disclosed or suggested herein.

Figure 2:
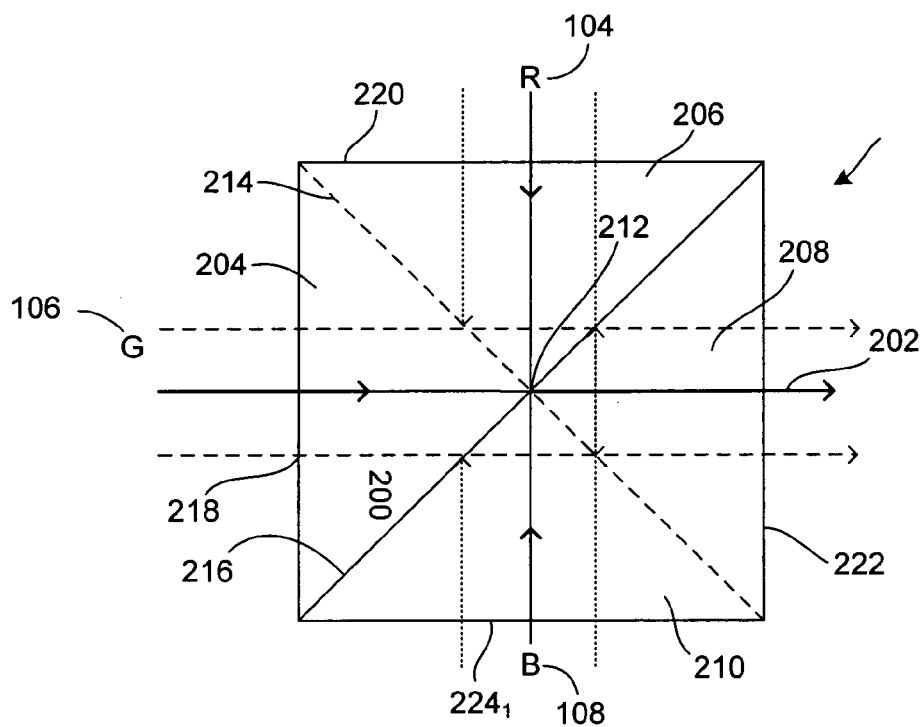
FIG. 2 is a side view of a conventional X-cube that combines separate R, G, and B light beams into a single, composite light beam.
Figure 2:
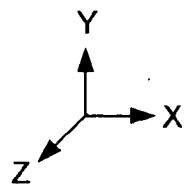
Figure 3:
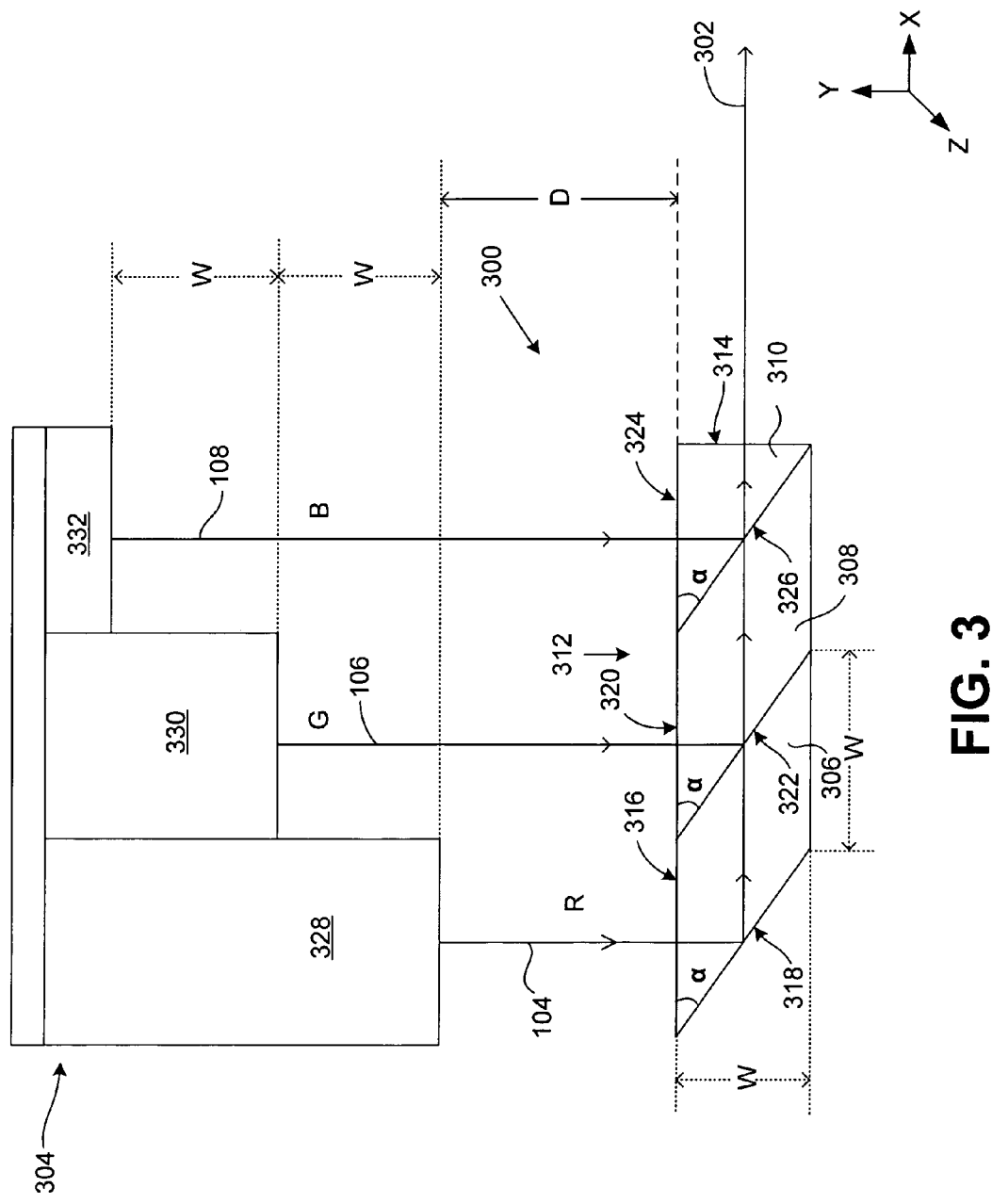
FIG. 3 is a side view of a beam combiner for combining separate R, G, and B light beams into a single, composite light beam and a diagram of an RGB beam source according to an embodiment of the invention.

FIG. 3 is a side view of a beam combiner 300 for combining separate R, G, and B light beams 104, 106, and 108 into a single, composite light beam 302, and a diagram of an RGB beam source 304 according to an embodiment of the invention. As discussed below, the combiner 300 is often easier and cheaper to manufacture than conventional combiners such as the X-cube 200 of FIG. 2.

The beam combiner 300 includes three sections 306, 308, and 310, which are bonded together and which are made from a transparent material such as glass or polymer suitable for optical applications. The combiner 300 also includes an input face 312 having a length of 3W and a rectangular cross section in the X-Z plane, and includes an output face 314 having a height of W and a square cross section in the Y-Z plane. In one embodiment, W=5.5 millimeters (mm), and in another embodiment W=3.5 mm. Both the input face 312 and the output face 314 are flat, optical-quality surfaces. The manufacture of the combiner 300 is discussed below in conjunction with FIGS. 6–7.

The first section 306 has a parallelogram-shaped cross section in the X-Y plane with a height and width of W and includes a segment input face 316, which forms part of the combiner input face 312, and a reflector face 318 for reflecting the R beam 104 toward the combiner output face 314. In one embodiment, the face 318 is made reflective by application of a conventional optical coating. One can select the reflective and transmissive properties of this coating (and the other coatings discussed below) according to the parameters of the beam-combiner system. The angle α between the input face 316 and the reflector face 318 is an acute angle. In a preferred embodiment, α=45° to allow the R beam 104 to have a maximum width in the X dimension equal to W. That is, if α=45°, then all portions of a W-width R beam will project onto the reflector face 318 as long as the R beam is properly aligned with the input face 316. If, however, the combiner 300 is designed for a R beam 104 having a width less than W, then the region of the face 318 that is reflective can be limited to the area that the R beam will strike. Alternatively the angle α can be made greater than 45°. But because the angle α is the same for all of the segments 306, 308, and 310, one should consider the effect on the other segments 308 and 310 before altering the value of α. Furthermore, if α does not equal 45°, then the angle of the R beam from the beam source 304 is adjusted such that the reflected R beam remains normal to the output face 314.

Similarly, the second section 308 has a parallelogram-shaped cross section in the X-Y plane with a height and width of W and includes a segment input face 320, which forms part of the combiner input face 312, and includes a reflector face 322, which lies along an interface between the sections 306 and 308 and passes the reflected R beam 104 and reflects the G beam 106 toward the combiner output face 314. In one embodiment, the face 322 is made reflective by application of a conventional optical coating to either or both the face 322 and the face of the section 306 that interfaces with the face 322. The angle α between the input face 320 and the reflector face 322 is an acute angle, and is preferably equal to 45° to allow the G beam 106 to have a maximum width in the W dimension equal to W. If, however, the combiner 300 is designed for a G beam 106 having a width less than W, then the region of the face 322 that is reflective can be limited to the area that the G beam will strike. Alternatively the angle α can be made greater than 45°. But because the angle α is the same for all of the segments 306, 308, and 310, one should consider the effect on the other segments 306 and 310 before altering the value of α. Furthermore, if α does not equal 45°, then the angle of the G beam from the beam source 304 is adjusted such that the reflected G beam remains normal to the output face 314.

The third section 310 has a triangular-shaped cross section in the X-Y plane and includes the combiner output face 314, a segment input face 324, which has a width of W and which forms part of the combiner input face 312, and a reflector face 326, which lies along an interface between the sections 308 and 310 and passes the reflected R and G beams 104 and 106 and reflects the B beam 108 toward the combiner output face. In one embodiment, the face 326 is made reflective by application of a conventional optical coating to either or both the face 326 and the face of the section 308 that interfaces with the face 326. The angle α between the input face 324 and the reflector face 326 is an acute angle, and is preferably equal to 45° to allow the B beam 108 to have a maximum width in the X-dimension equal to W. If, however, the combiner 300 is designed for a B beam 108 having a width less than W, then the region of the face 326 that is reflective can be limited to the area that the B beam will strike. Alternatively the angle α can be made greater than 45°. But because the angle α is the same for all of the segments 306, 308, and 310, one should consider the effect on the other segments 306 and 308 before altering the value of α. Furthermore, if α does not equal 45°, then the angle of the B beam from the beam source 304 is adjusted such that the reflected B beam is normal to the output face 314. Moreover, an angle β between the section input face 324 and the output face 314 is substantially a right angle in a preferred embodiment.

The beam source 304 includes three beam-generating sections 328, 330, and 332 for respectively generating the R, G, and B beams such that they traverse paths having substantially the same optical length. This causes the images of the R, G, and B light-emitting points in the combined beam to occur at the same distance from the output face 314 of the beam combiner 300, and thus allows focusing of all three colors to the same plane with a single focusing lens located after the output face of the beam combiner. For purpose of illustration, assume that the center rays (shown in solid line) of the R, G, and B beams enter the respective centers (in the X dimension) of the faces 316, 320, and 324 as shown in FIG. 3, and that the beam combiner 300 and the medium between the beam combiner and the beam source 304 have respective indices of refraction equal to one. Consequently, the R-beam center ray strikes and is reflected from the center (in the Y dimension) of the face 318, and the reflected R-beam propagates through the centers (in the Y dimension) of the faces 322, 326, and 314. Using known geometrical principles, the length of the path traversed by the R-beam center ray from the section 328 to the face 314 equals D+3W—½W from the face 316 to the face 318, 2W from the face 318 to the face 326, and ½W from the face 326 to the face 314—where D≧0. By respectively locating the beam-generator sections 330 and 332 W and 2W farther away from the combiner input face 312 than the section 328 is, the lengths of the paths traversed by the G- and B-beam center rays to the output face 314 are set to the same optical length D+3W. Moreover, using known geometrical principles, one can show that the outer rays (not shown in FIG. 3) of the R, G, and B beams also traverse the same optical path length D+3W. Consequently, all rays of the R, G, and B beams will traverse the same optical path length even if the center rays (solid line) of the beams are not respectively aligned with the centers of the segment-input faces 316, 320, and 324.

Although the preceding discussion approximates optical path length as actual path length, one of skill in the art will realize that the optical path length through a medium other than free space is typically longer than the actual path length due to the medium having an index of refraction that is greater than one. Consequently, one can more precisely equalize the optical path lengths that the R, G, and B beams traverse by accounting for the indices of refraction of the segments 306, 308, and 310 and the medium between the beam combiner and the beam source 304 when determining the respective distances between the beam-generating sections 328, 330, and 332 and the input face 312.

Moreover, the beam source 304 is preferably aligned with the beam combiner 300 such that the center rays (solid line) of the R, G, and B beams 104, 106, and 108 are respectively aligned with the centers (in the X dimension) of the section input faces 316, 320, and 324. However, even if the center rays are not aligned with the face centers, the R, G, and B beams will be aligned such that, in the composite beam 302, the center rays of all three beams will be approximately collinear.

Still referring to FIG. 3, the operation of the beam combiner 300 is discussed according to an embodiment of the invention. For purpose of illustration, optical path length is approximated as actual path length in the following discussion. But as discussed above, one of ordinary skill in the art would be able to more precisely equalize the optical paths traversed by the R, G, and B beams by accounting for the indices of refraction along those paths.

The R beam 104 propagates the distance D from the beam-generating section 328 to the beam-input face 316, and is substantially normal to the beam-input face. Preferably, the center ray of the R beam is aligned with the center of the face 316 in the X dimension. Next, the R beam propagates the distance W/2 from the face 316 to the reflector 318. Then, the reflected R beam, which is substantially parallel to the face 316, propagates the distance 2W from the reflector 314 to the reflector 326, and then propagates another W/2 to the beam-output face 314 as part of the composite beam 302, which is substantially normal to the beam-output face. Therefore, as stated above, the optical length of the R-beam path from the beam-generator section 328 to the beam-output face 314 is D+3W.

The G beam 106 propagates the distance W+D from the beam-generating section 330 to the beam-input face 320, and is substantially normal to the beam-input face. Preferably, the center ray of the G beam is aligned with the center of the face 320 in the X dimension. Next, the G beam propagates the distance W/2 from the beam-input face 320 to the reflector 322. Then, the reflected G beam, which is substantially parallel to the face 320 and substantially coincident with the reflected R beam 104, propagates the distance W from the reflector 322 to the reflector 326, and then propagates another W/2 to the beam-output face 314 as part of the composite beam 302. Therefore, as stated above, the optical length of the G-beam path from the beam-generator section 330 to the beam-output face 314 is D+3W.

The B beam 108 propagates the distance 2W+D from the output of the beam-generating section 332 to the beam-input face 324, and is substantially normal to the beam-input face. Preferably, the center ray of the B beam is aligned with the center of the face 324 in the X direction. Next, the B beam propagates the distance W/2 from the beam-input face 324 to the reflector 326. Then, the reflected B beam which is substantially parallel to the face 324 and substantially coincident with the reflected R and G beams, propagates a distance of W/2 from the reflector 326 to the beam-output face 314 as part of the composite beam 302. Therefore, as stated above, the optical length of the B-beam path from the beam-generator section 332 to the beam-output face 314 is D+3W.

Still referring to FIG. 3, if the composite beam 302 is an image beam, i.e., includes the R, G, and B components of an entire image, then the R, G, and B beams respectively include the instantaneous red, green, and blue components of the image. One can use an optional optical assembly (not shown in FIG. 3) to project the composite beam, and thus the image, onto a display screen (not shown in FIG. 3).

Figure 1:
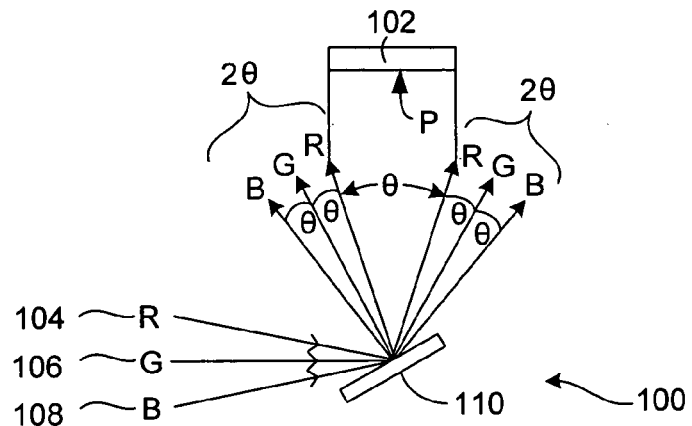
FIG. 1 is a diagram of an image generator that scans a color image using R, G, and B light beams.

Alternatively, if the composite beam 302 is a pixel beam, i.e., includes the R, G, and B components of a single pixel, then the R, G, and B beams respectively include the instantaneous red, green, and blue components of the pixel. One can use a scanner such as the scanning mirror 110 of FIG. 1 to generate an image by sweeping the composite beam across a display screen (not shown in FIG. 3).

Alternate embodiments of the beam combiner 300 and beam source 304 are contemplated. In one such embodiment, the R, G, and B beams may enter the input face 312 of the beam combiner 300 in an order other than the order (R-G-B) shown. For example, instead of the beam-generator section 328 generating the R beam and the beam-generator section 332 generating the B beam, the section 328 can generate the B beam and the section 332 can generate the R beam such that the R and B beams enter the combiner sections 310 and 306, respectively. Where the beams do not enter the input face 312 in the same order in which they appear in the electromagnetic spectrum (RGB or BGR), the reflective coatings that form the reflectors 318, 322, and 326 are more complex, requiring a band-pass response instead of a low- or high-pass response. Furthermore, the input face 312 may have other than a rectangular cross section, and the output face may have other than a square cross section. Moreover, one of the sections 306 or 308 may be omitted so that the combiner 300 generates the composite beam 302 from only two beams, such as R and B, R and G, or G and B. In addition, one can add additional sections that are similar to the sections 306 and 308 so that the combiner 300 generates the composite beam 302 from more than three beams. Furthermore, the widths of the segment input faces 316, 320, and 324 need not be equal. But to allow transfer of all the energy in the R, G, B beams to the combined beam 302 in this situation, the widths of the beams 104, 106, and 108 where they enter the respective segment input faces 316, 320, and 324 are typically no greater than the widths of the respective segment input faces. Moreover, where the width of the face 324 is greater than the width of the face 320, the segment 310 has a truncated triangular shape (flat bottom). In addition, although the segment input faces 316, 320, and 324 are shown as being coplanar to form a planar input face 312, the segment input faces need not be coplanar, and thus the input face 312 need not be planar. For example, the segment input face 316 may extend further toward, or abut, the beam-generator section 328. Similarly, the segment input face 320 may extend further toward, or abut, the beam-generator section 330, and the segment input face 324 may extend further toward, or abut, the beam-generator section 332. Depending on the system parameters, this may reduce the distance between the beam combiner 300 and the beam source 304, and thus may reduce the overall size of a module that includes the combination of the beam combiner and beam source. Furthermore, extending the segment input faces 316, 320, and 324 such that they respectively abut (or nearly abut) the beam-generator sections 328, 330, and 332 inherently equalizes the optical path lengths because the R, G, and B beams are propagating through only one material having a single index of refraction before emerging from the output face 314.

Figure 4:
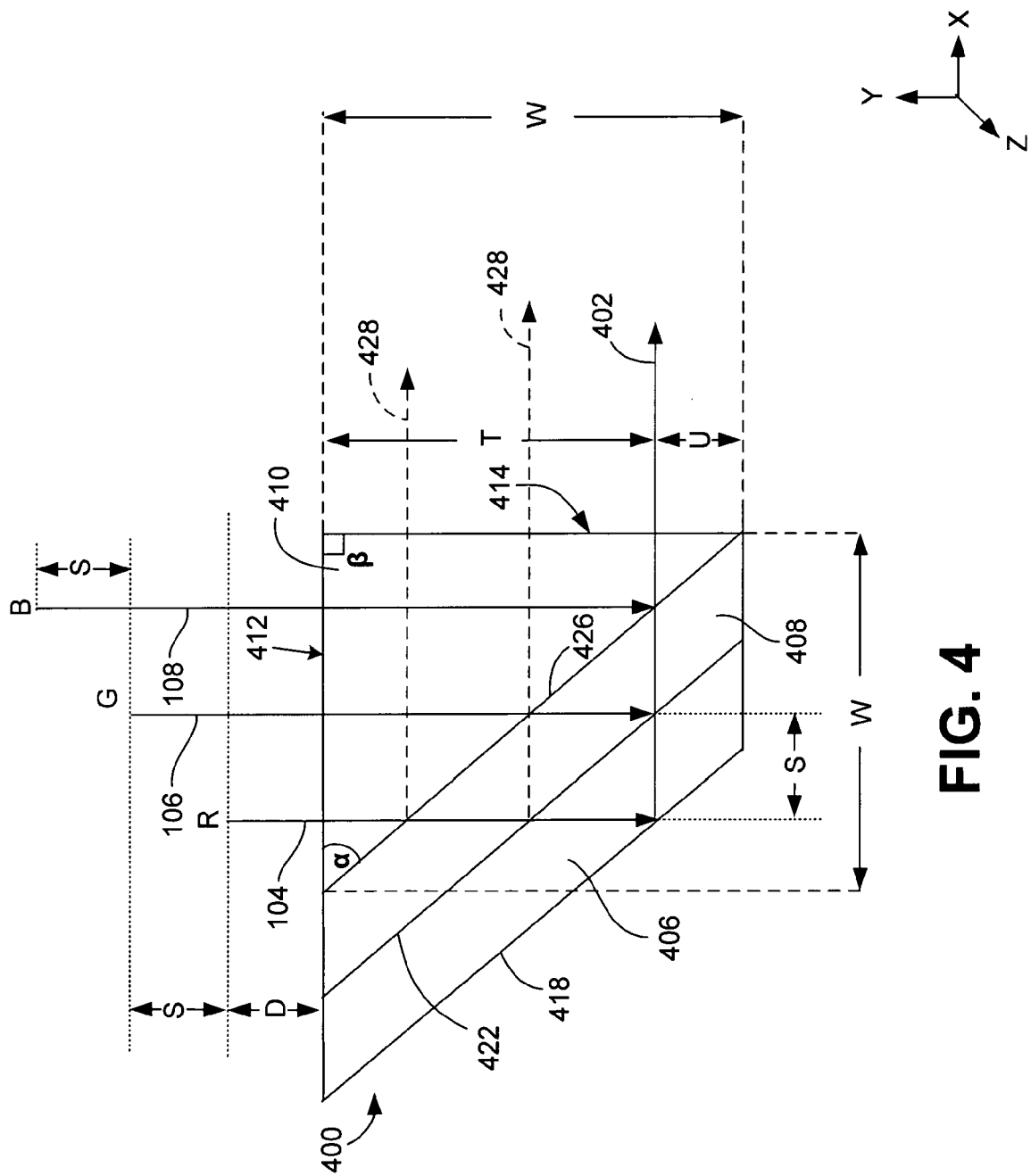
FIG. 4 is side view of a beam combiner for combining separate R, G, and B light beams into a single, composite light beam according to another embodiment of the invention.

FIG. 4 is a side view of a beam combiner 400 for combining separate R, G, and B light beams 104, 106, and 108 (only center rays shown in FIG. 4) into a single, composite light beam 402 according to another embodiment of the invention. As discussed above in conjunction with FIG. 3, optical path length is approximated as actual path length in the following discussion. The combiner 400 is similar to the combiner 300 of FIG. 3 except that it allows the optical path lengths of the R, G, and B beams to be reduced. These reduced optical path lengths also allow the combiner 400 to receive R, G, and B beams having larger numerical apertures, and allow a reduction in the size of a module that includes the combiner 400 and a beam source (omitted from FIG. 4 for clarity). In one embodiment, the beam source is the same as the beam source 304 of FIG. 3 but is located closer to the beam combiner 400 than it is to the combiner 300.

The beam combiner 400 includes three sections 406, 408, and 410 that are bonded together and that are made from a transparent material such as glass or polymer suitable for optical applications. The combiner 400 includes an input face 412, which is also the input face of the section 410, and which has a length W and a square cross section in the X-Z plane, and includes an output face 414 having a height W and a square cross section in the Y-Z plane. Both the input face 412 and the output face 414 are flat optical-quality surfaces. The manufacture of the combiner 400 is discussed below in conjunction with FIGS. 6–7.

The first section 406 has a parallelogram-shaped cross section in the X-Y plane, a width of S in the X dimension, and includes a reflector face 418 for reflecting the R beam toward the combiner output face 414. Because S is significantly smaller than the width W of the segment 306 of FIG. 3, the optical path length of the R beam can be made significantly smaller than 3W+D as discussed below. In one embodiment, the face 418 is made reflective by application of a conventional optical coating.

Similarly, the second section 408 has a parallelogram-shaped cross section in the X-Y plane, a width of S in the S dimension, and includes a reflector face 422, which lies along an interface between the sections 406 and 408 and which passes the reflected R beam and reflects the G beam toward the combiner output face 414. Again, because S is significantly smaller than the width W of the segment 308 of FIG. 3, the optical path length of the G beam can be made significantly smaller than 3W+D as discussed below. In one embodiment, the face 422 is made reflective by application of a conventional optical coating to either or both the face 422 and the face of the section 406 that interfaces with the face 422.

Like the third section 310 of FIG. 3, the third section 410 has a triangular-shaped cross section in the X-Y plane and includes the combiner input and output faces 412 and 414 and a reflector face 426, which lies along an interface between the sections 408 and 410 and which passes the reflected R and G beams and reflects the B beam toward the output face 414. In one embodiment, the face 326 is made reflective by application of a conventional optical coating to either or both the face 426 and the face of the section 408 that interfaces with the face 426. The angle α between the input face 412 and the reflector face 326 is an acute angle, and is preferably equal to 45°. But if α does not equal 45°, then the angle of the B beam incident to the face 412 is adjusted such that the reflected B beam remains normal to the output face 414. Furthermore, the angle β between the section input face 324 and the output face 314 is a right angle in a preferred embodiment.

Using known geometrical principles, the length of the path traversed by the R-beam center ray from the beam generator (not shown in FIG. 4) 328 to the face 414 equals D+T+2S+U=D+2S+W (where W=T+U). So that the center rays of both the G and B beams traverse the same path length, the G and B beam-generator sections (not shown in FIG. 4) are respectively placed D+S and D+2S away from the beam input face 412. Where S is smaller than W, the common optical path length for the combiner 400 is less than the common optical path length of the combiner 300 of FIG. 3. That is, D+2S+W<D+3W where S<W. Consequently, the level of beam aberration associated with the combiner 400 can be significantly less than that associated with the combiner 300. Furthermore, one can select a value of S and position the R, G, and B beams such that the composite beam 402 exits the center of the beam output face 414 in the Y dimension, i.e., U=T=W/2.

Because the R beam passes through the B and G reflector faces 422 and 426 before striking the R reflective face 418, and because the G beam passes through the B reflector face 426 before striking the G reflective face 422, the spectra of the R and G beams and the faces 422 and 426 are non overlapping so that the combiner 400 does not generate artifacts such as "ghost" images. Specifically, if the face 422 or 426 reflects any of the R beam, or if the face 426 reflects any of the G beam (such reflections are shown in dashed line), then one or more unwanted beams 428 (dashed line) will emanate from the beam output face 414 in addition to the composite beam 402. These unwanted beams 428 may cause unwanted artifacts in the generated image. Consequently, it is preferred that the R beam contain no wavelengths that are within the spectrum of wavelengths that the faces 422 and 426 reflect, and that the G beam contain no wavelengths that are within the spectrum of wavelengths that the face 426 reflects. One technique for accomplishing this is to tune the beam generator (not shown in FIG. 4) such that the R and G beams contain no such unwanted wavelengths. Another technique is to filter such unwanted wavelengths from the R and G beams before they enter the combiner 400.

In another embodiment, the level of artifacts such as "ghost" images is reduced or eliminated by making S large enough so that the unwanted beams 428 of the R and G beams are sufficiently spaced from the composite beam 402.

Furthermore, if the R beam (or a portion thereof) incident on the input face 412 is shifted to the left such that the beam is not incident on the face 426, then the R beam (or portion thereof) does not generate a corresponding unwanted beam 428. Likewise, if the R beam (or a portion thereof) is shifted further to the left such that it is not incident on the face 422, then the R beam (or portion thereof) does not generate unwanted beams 428 corresponding to the faces 422 and 428. A similar analysis applies to the G beam.

Still referring to FIG. 4, the operation of the beam combiner 400 is similar to the operation of the beam combiner 300 as discussed above in conjunction with FIG. 3.

Alternate embodiments of the beam combiner 400 are contemplated. In one such embodiment, the R, G, and B beams may enter the input face 412 of the beam combiner 400 in an order other than the order (R-G-B) shown. For example, instead of the B beam entering the combiner 400 closest to the output face 414, one may swap the positions of the R and B beams. Furthermore, the ends of the sections 406 and 408 need not be coplanar with the input face 412. Conversely, the R or G beams may be incident on the sections 406 and 408 instead of on the section 410. Moreover, one of the segments 406 or 408 may be omitted so that the combiner 400 generates the composite beam 402 from only two beams. In addition, one can add additional sections that are similar to the sections 406 and 408 so that the combiner 400 generates the composite beam 402 from more than three beams. Furthermore, the input face 412 may have other than a rectangular cross section, and the output face 414 may have other than a square cross section.

Figure 5:
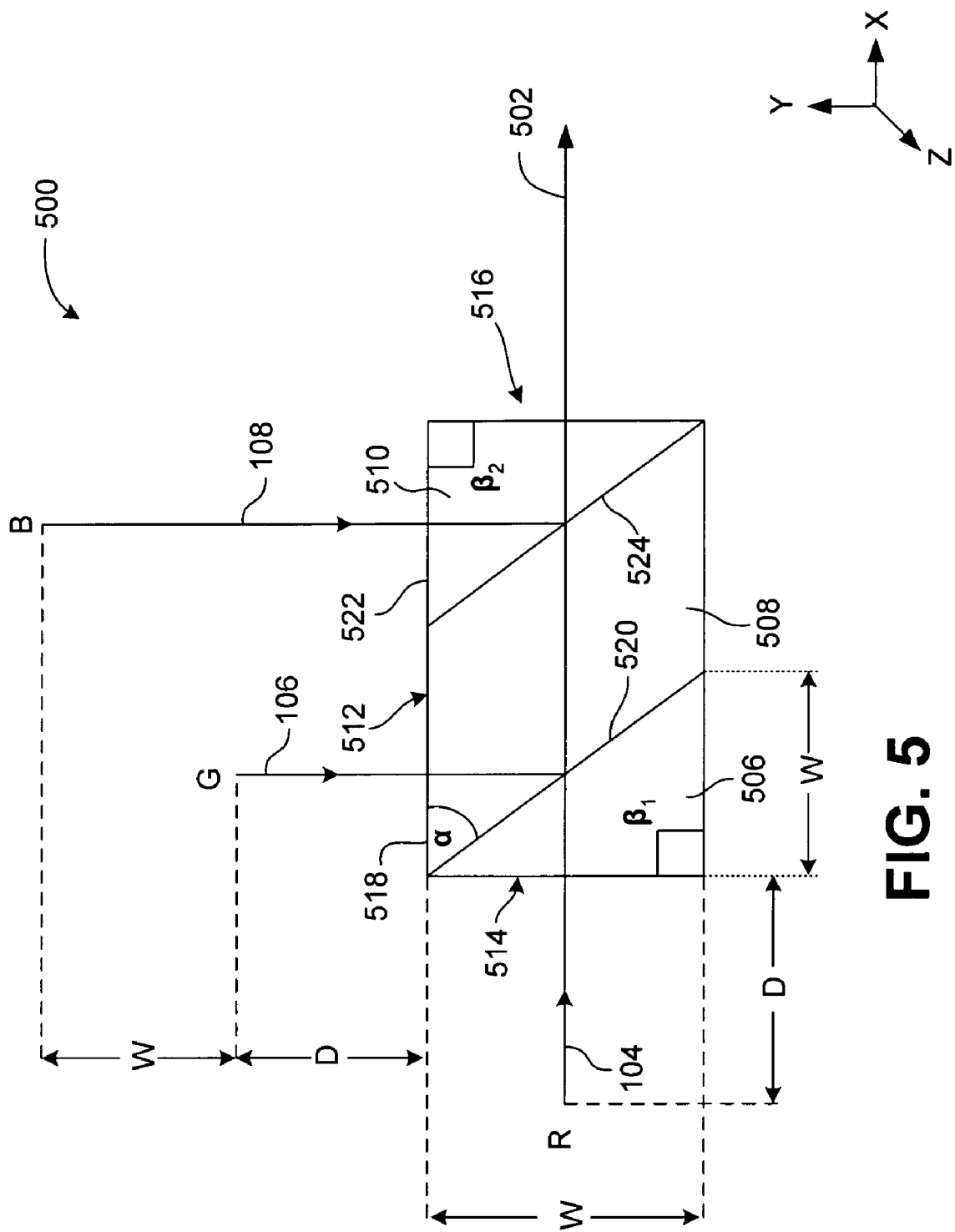
FIG. 5 is side view of a beam combiner for combining separate R, G, and B light beams into a single, composite light beam according to another embodiment of the invention.

FIG. 5 is a side view of a beam combiner 500 for generating a composite beam 502 according to another embodiment of the invention. As discussed above in conjunction with FIGS. 3 and 4, optical path length is approximated as actual path length in the following discussion. The combiner 500 is similar to, but smaller than, the beam combiner 300 of FIG. 3. The reduced optical path lengths in the combiner 500 allow the combiner to receive R, G, and B beams having larger numerical apertures, and allow a reduction in the size of a module that includes the combiner and a beam source (omitted from FIG. 5). Furthermore, the combiner 500 has fewer reflective faces than the comber 300, and thus may be easier and less expensive to manufacture.

The beam combiner 500 includes three sections 506, 508, and 510 that are bonded together and that are made from a transparent material such as glass or polymer suitable for optical applications. The combiner 500 includes two input faces 512 and 514 having a length 2W and a height W, respectively, and includes an output face 516 having a height W. The input face 512 has a rectangular cross section in the X-Z plane, and the input face 514 and the output face 516 each have a square cross section in the Y-Z plane. The input faces 512 and 514 and the output face 516 are flat optical-quality surfaces. The manufacture of the combiner 500 is discussed below in conjunction with FIGS. 6–7.

The first section 506, which effectively replaces the section 306 of FIG. 3, has a triangular-shaped cross section in the X-Y plane and includes the combiner input face 514, which receives the R beam 104, and has an angle, β1, which is preferably a right angle.

The second section 508 and the third section 510 are similar or identical to the second and third sections 308 and 310 of FIG. 3. The second section 508 includes a segment input face 518, which forms part of the second combiner input face 512, and includes a reflector face 520. The third section 510 includes the combiner output face 516, a segment input face 522, which forms part of the combiner input face 512, and a reflector face 524.

Referring to FIGS. 3 and 5, by replacing the parallelogram section 306 with the triangular section 506 and receiving the R beam via the input face 514 instead of the input face 512, the combiner 500 can allow a reduction in the aberration of the composite beam 502. Specifically, the path of the R beam through the combiner 500 is 2W, which is 33% shorter than the R-beam path (3W) through the combiner 300. Consequently, by placing the R beam-generating section 328 of the beam generator 304 a distance D from the input face 514, and by placing the G and B sections 330 and 332 respective distances D and D+W from the input face 512, one can reduce the optical path lengths of the R, G, and B beams to D+2W, and thus reduce the aberration of the composite beam 502. Furthermore, reducing the distance between the beam generator 304 and the combiner 500 allows for a more compact image-beam generator as discussed below in conjunction with FIG. 8.

The operation of the beam combiner 500 is similar to the operation of the beam combiner 300 of FIG. 3.

Alternate embodiments of the beam combiner 500 are contemplated. In one such embodiment, the R, G, and B beams may enter the input faces 512 and 514 of the beam combiner 500 in an order other than the order (R-G-B) shown. For example, instead of the input face 514 receiving the R beam and the input face 522 receiving the B beam, the input face 514 can receive the B beam and the input face 522 can receive the R beam. Furthermore, the cross section of the input face 512 may be other than rectangular, and the cross sections of the faces 514 and 516 may be other than square. Moreover, one can omit the section 508 so that the combiner 500 generates the composite beam 502 from only two beams. In addition, one can add additional sections that are similar to the section 508 so that the combiner 500 generates the composite beam 502 from more than three beams.

As an alternative, the beam combiner may be assembled such that input faces 518 and 522 are not coplanar, but rather are parallel planes. For example, face 522 may be raised by a distance W toward the blue light source. This results in a beam combiner that provides inherent optical path length equalization.

Figure 6:
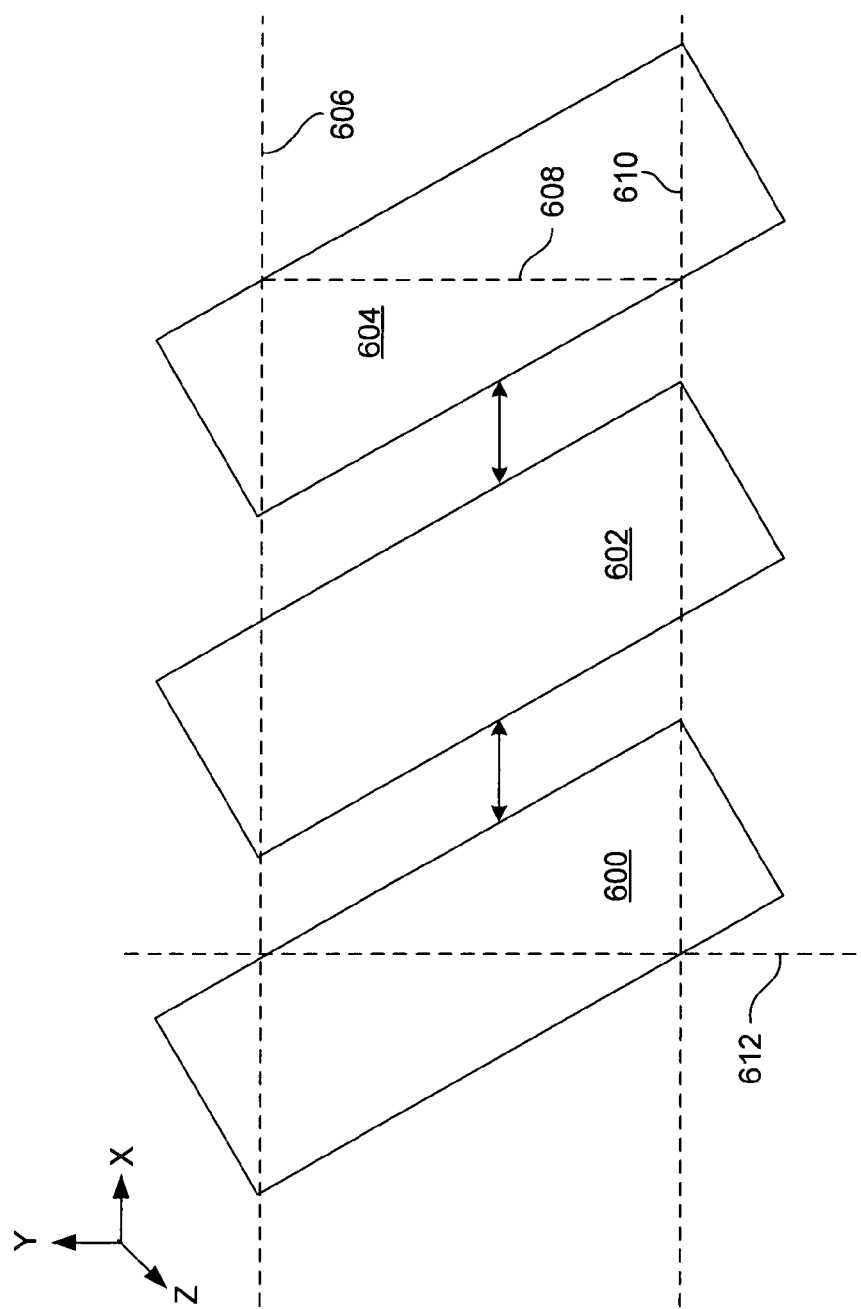
FIG. 6 illustrates methods of manufacturing the beam combiners of FIGS. 3–5 according to an embodiment of the invention.

FIG. 6 illustrates a method for manufacturing the beam combiners 300, 400, and 500 of FIGS. 3–5 according to an embodiment of the invention.

First, one conventionally coats the surfaces of transparent slabs 600, 602, and 604 with the desired wavelength-sensitive reflective optical coatings as discussed above in conjunction with FIGS. 3–5. One can typically obtain optical-quality slabs of glass or other transparent material "off the shelf" from optical suppliers. Therefore, one typically need not polish the surfaces of the slabs 600, 602, or 604 before applying the optical coatings. Furthermore, to form the combiner 300 of FIG. 3 or the combiner 500 of FIG. 5, all of the slabs typically have the same thickness, although this is not a requirement. To form the combiner 400 of FIG. 4, however, the slabs 600 and 602 typically have the same thickness but are thinner than the slab 604.

Next, one bonds the optically coated slabs 600, 602, and 604 together using a conventional optical adhesive.

Then, one cuts the bonded slabs along the appropriate dashed cut lines to form the combiner. To form the combiner 300 of FIG. 3, one cuts the slabs 600, 602, and 604 along the lines 606, 608, and 610. To form the combiner 400 of FIG. 4, one cuts the slab 604 along the lines 606 and 608. If no beams will enter the slabs 600 or 602, one need not cut through the slabs 600 and 602 along the lines 606 and 610, although one may do so. And to form the combiner 500 of FIG. 5, one cuts the slabs 600, 602, and 604 along the lines 606, 608, 610, and 612. In all cases, one also cuts the slabs along a line (not shown) to give the combiner the desired depth in the Z dimension. One can use any conventional tool or technique, such as water-jet or laser technology, to cut the slabs.

Next, one conventionally polishes the beam-receiving and beam-projecting surfaces of the cut slabs to an optical-quality finish. For example, to form the combiner 300 (FIG. 3), one polishes the surfaces formed by the cuts along the lines 606 and 608.

Although one can cut and polish the slabs before bonding them together, this may increase the manufacturing complexity and cost because one must properly align the cut and polished pieces before bonding.

Figure 7:
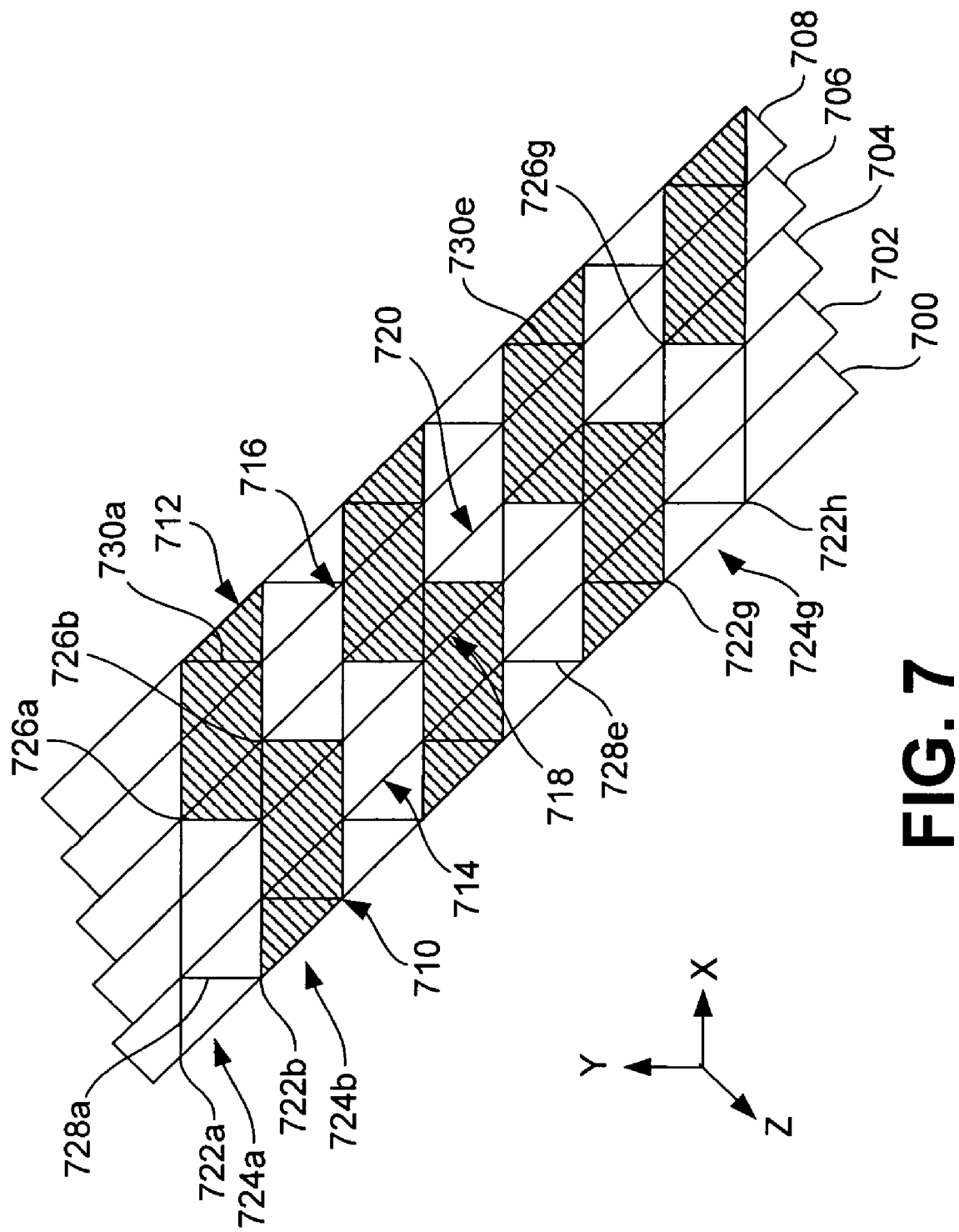
FIG. 7 illustrates methods of mass producing the beam combiners of FIGS. 3–5 according an embodiment of the invention.

FIG. 7 illustrates a method for manufacturing the beam combiners 300, 400, and 500 of FIGS. 3–5 according to another embodiment of the invention. Unlike the method of FIG. 6, this method allows the simultaneous manufacture of multiple combiners from the same slabs. This mass production often reduces the per-combiner manufacturing complexity and cost.

First, one conventionally coats the surfaces of three or more transparent slabs. The example of FIG. 7 shows 700, 702, 704, 706, and 708 with the desired wavelength-sensitive reflective optical coatings as discussed above in conjunction with FIGS. 3–5. The slabs 700, 702, and a first portion of the slab 704 will form a first group of combiners, and the slabs 706, 708, and a second portion of the slab 704 will form a second group of combiners as described below. For example, to form combiners 300 (FIG. 3), one applies a red-reflecting coating to the faces 710 and 712 of the slabs 700 and 708, a green-reflecting/red-passing coating to the faces 714 and 716 of the slabs 702 and 706, and a blue-reflecting/red-and-green-passing coating to the faces 718 and 720 of the slab 704. As stated above in conjunction with FIG. 6, these slabs typically have optical-quality surfaces, so one need not polish the surfaces of the slabs before applying the optical coatings. Furthermore, to form the combiner 300 of FIG. 3 or the combiner 500 of FIG. 5, all of the slabs typically have the same thickness. To form the combiner 400 of FIG. 4, however, the slabs 700, 702, 706, and 708 typically have the same thickness but are thinner than the slab 704.

Next, one bonds the optically coated slabs 700, 702, 704, 706, and 708 together using a conventional optical adhesive. The ends of the slabs are staggered as shown to maximize the number of combiners that can be formed.

Then, one cuts the bonded slabs along the horizontal lines 722a–722h to form individual plates 724a–724g. At this point, one can, but does not need to, polish the tops and bottoms of the plates (the optically coated sides have already been polished) to an optical-quality finish, as discussed above.

Next, one cuts the plates 724a–724g in half along the vertical lines 726a–726g.

Then, to form either combiners 300 (FIG. 3) or 400 (FIG. 4), one polishes the appropriate surfaces of the resulting half plates. For example, to form combiners 300 (FIG. 3), one polishes the top (along cut 722a) and side (along cut 726a) surfaces of the left half of the plate 724a to respectively form the input faces 312 and the output faces 314 (FIG. 3). Then one cuts the polished half plates along one or more vertical planes (not shown) that are parallel to the X-Y plane to form the combiners 300 or 400. For example, if the half plates have depths of ten centimeters (cm) in the Z dimension and one wants combiners 300 that are one cm thick in the Z dimension, then one cuts the half plates at one cm intervals in the Z dimension along planes that are parallel to the X-Y plane. Because the surfaces formed by these cuts neither receive nor emanate light beams, they need not be polished.

To form the combiners 500 (FIG. 5), one cuts the half slabs along the lines 728a–728g and 730a–730g. Then, one polishes the appropriate surfaces of the cut half plates. For example, to form one or more combiners 500 from the left half of the plate 724a, one polishes both end surfaces (along cut lines 726a and 728a) and the top surface (along the cut line 722a) to an optical-quality finish. Then one cuts the polished half plates in the Z dimension along one or more vertical planes (not shown) that are parallel to the X-Y plane to form the combiners 500 in a manner similar to that discussed in the preceding paragraph.

Referring to FIGS. 6 and 7, alternate embodiments of the described manufacturing methods are contemplated. For example, one can perform the cutting, polishing, and bonding steps in any order that yields the desired beam combiner or combiners. Furthermore, one can apply the reflective optical coatings to opposite surfaces of the same interface. For example, instead of applying the green-reflecting/red-passing coating to the faces 714 and 716 of the slabs 702 and 706, one can apply this coating to the respective abutting faces of the slabs 700 and 708. Or one can apply the coating to both the faces 714 and 716 and to the respective abutting faces of the slabs 700 and 708. In addition, one can add additional pairs of transparent slabs to increase the number of combiners yielded by each plate 724.

Figure 8:
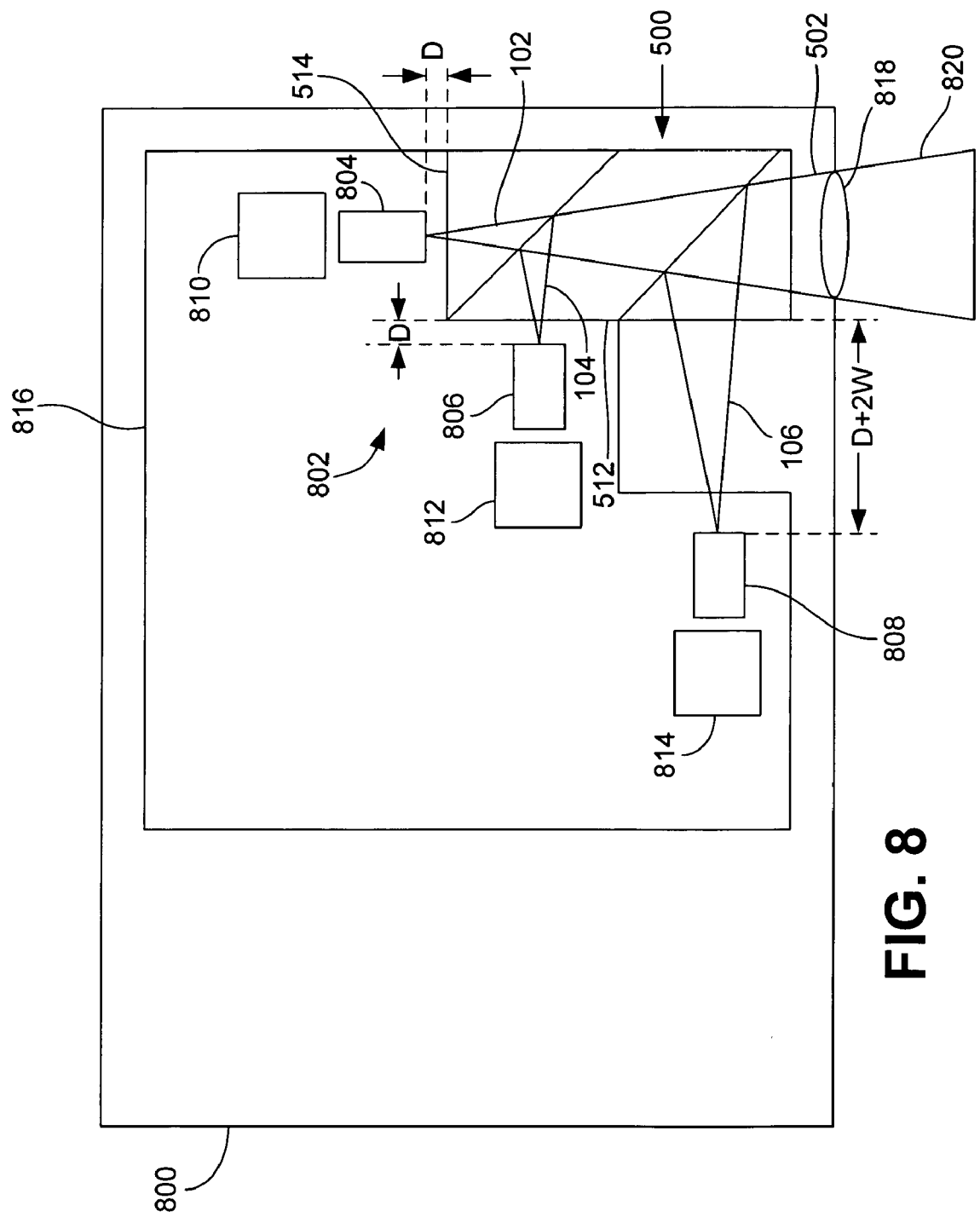
FIG. 8 is a diagram of an image-beam generator that incorporates the beam combiner of FIG. 5 according to an embodiment of the invention.

FIG. 8 is a diagram of an image-beam generator 800 that incorporates the beam combiner 500 of FIG. 5 according to an embodiment of the invention. As discussed above in conjunction with FIGS. 3, 4, and 5, optical path length is approximated as actual path length in the following discussion. The image-beam generator 800 includes a beam source 802, which includes conventional single-pixel beam generators 804, 806, and 808, such as laser diodes or light-emitting diodes (LEDs), for respectively generating the R, G, and B beams 102, 104, and 106. As discussed above in conjunction with FIG. 5, the R and G beam generators 804 and 806 are each located a distance D from the beam input faces 514 and 512, respectively, and the B generator 808 is located D+2W from the input face 512. The beam source 802 also includes drivers 810, 812, and 814 for respectively driving the beam generators 804, 806, and 808. The sources 804, 806, and 808 and the drivers 810, 812, and 814 compose the respective R, G, and B beam-generating sections of the beam source 802. The image-beam generator 800 may also include a heat sink 816 for dissipating heat generated by the drivers and beam generators, and includes an optical train 818, such as a lens, for generating an image beam 820 from the composite beam 502. For example, the train 818 may generate the image beam 820 by, e.g., correcting for aberration of the composite beam 502 or focusing the composite beam. As discussed below in conjunction with FIG. 9, a scanner (not shown in FIG. 8) sweeps the beam 820 across a screen or one's retina to generate an image.

In operation, the beam source 802 temporally modulates the intensities of the R, G, and B beams to change the color and other characteristics of the image beam 820 on a pixel-by-pixel basis.

Alternate embodiments of the image-beam generator 800 are contemplated. For example, by modifying the locations of the R, G, and B beam generators 804, 806, and 808, the generator 800 can incorporate the beam combiner 300 (FIG. 3) or 400 (FIG. 4) instead of the combiner 500. Furthermore, the beam generators 804, 806, and 808 can be modified so that they can generate the R, G, and B components of an entire image such that the beam 820 projects an entire image, not just one pixel of an image. In addition, the positions of the R and B generators 804 and 808 can be swapped as discussed above in conjunction with FIG. 5. Moreover, the beam source 802 may generate only one or two of the R, G, and B beams such that the image beam is monochrome or otherwise does not range over the full color spectrum.

Figure 9:
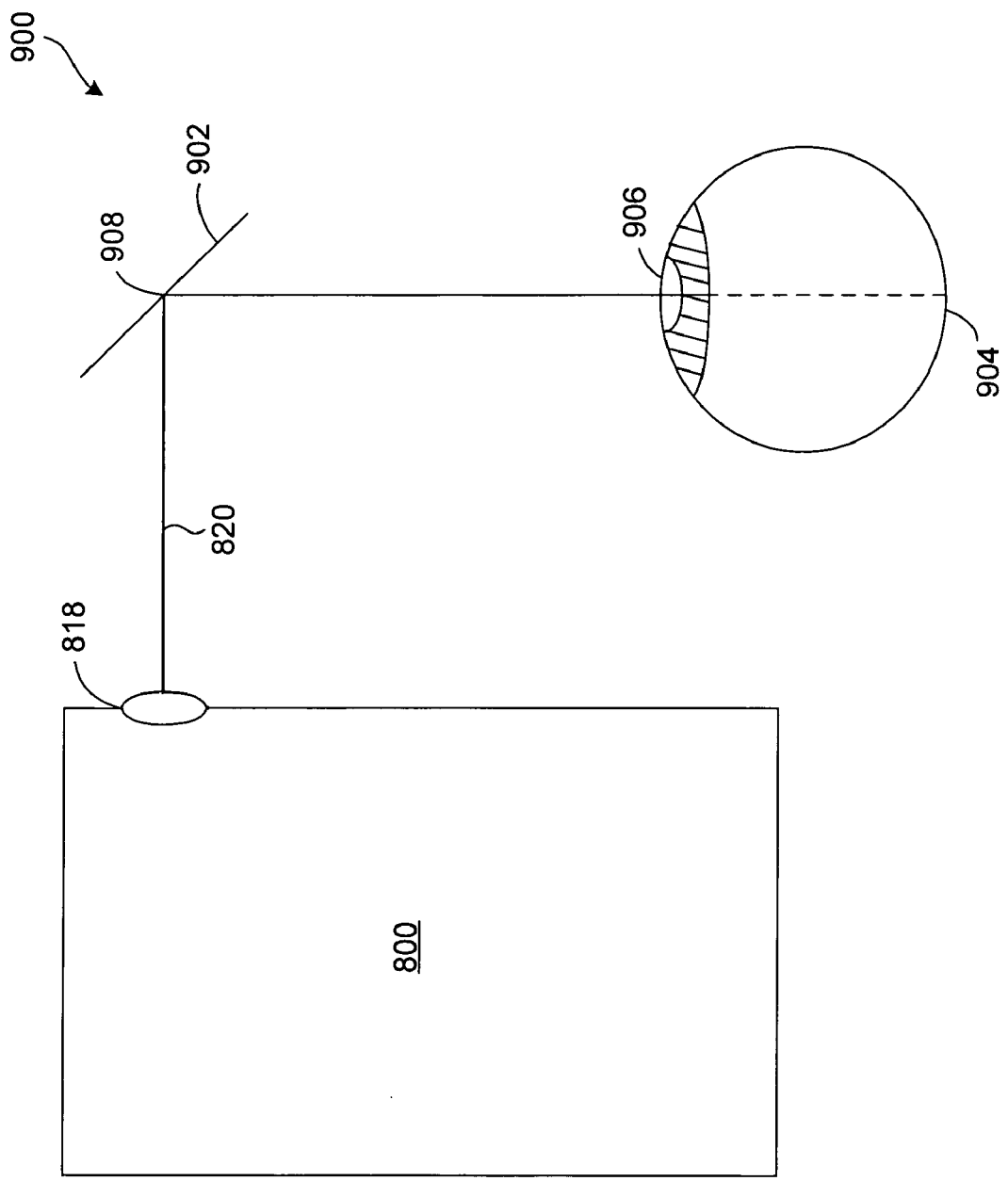
FIG. 9 is a diagram of an image generator that incorporates the image-beam generator of FIG. 8 according to an embodiment of the invention.

FIG. 9 is a diagram of an image generator 900 that incorporates the image-beam generator 800 of FIG. 8 according to an embodiment of the invention. In addition to the generator 800, the system 900 includes a conventional scanning mirror 902, such as a microelectromechanical (MEM) mirror that is operable to sweep the image beam 820 across a display surface such as a retina 904 to generate an image thereon. When the image generator 900 is used to sweep the beam 820 across a retina, it is sometimes called a virtual retinal display (VRD).

In operation, the image-beam generator 800 directs the image beam 820 onto the mirror 902 via the optical train 818. The mirror 902 is operable to sweep the beam 820 through a pupil 906 and across the retina 904 by rotating back and forth about an axis 908.

What is claimed is:

1. An image generator, comprising:
    a beam combiner, comprising,
        a first beam input face aligned to receive first and second beams of electromagnetic energy respectively having a first and second wavelengths,
        a beam output face,
        a first reflector aligned to reflect the first received beam toward the beam output face, and
        a second reflector aligned to pass the first beam from the first reflector and to reflect the received second beam toward the beam output face;

a first beam source located a first distance from the first beam input face and operable to generate the first beam of electromagnetic energy; and a second beam source located a second distance from the first beam input face and operable to generate the second beam of electromagnetic energy, the second distance being different than the first distance.

2. The image generator of claim 1 wherein:

the first beam input face is aligned to receive a third beam of electromagnetic energy having a third wavelength;

the beam combiner comprises a third reflector aligned to reflect the received third beam toward the beam output face; and the first and second reflectors are aligned to pass the third beam from the third reflector.

3. The image generator of claim 1 wherein:

the first and second beams respectively comprise green and blue light;

the first beam input face is aligned to receive a third beam of red light;

the beam combiner comprises a third reflector aligned to reflect the received third beam toward the beam output face; and the first and second reflectors are aligned to pass the third beam from the third reflector.

4. The image generator of claim 1 wherein:

the beam combiner comprises a second beam input face aligned to receive a third beam of electromagnetic energy having a third wavelength and directed toward the beam output face; and the first and second reflectors are aligned to pass the third beam from the second beam input face.

5. The image generator of claim 1 wherein:

the first and second beams respectively comprise green and blue light;

the beam combiner comprises a second beam input face aligned to receive a third beam of red light directed toward the beam output face; and the first and second reflectors are aligned to pass the third beam from the second beam input face.

6. The image generator of claim 1 wherein:

the first reflector is substantially planar; and the second reflector is substantially planar and is substantially parallel to the first reflector.

7. The image generator of claim 1 wherein:

the first beam input face is substantially planar; and the second reflector is substantially planar and intersects the beam input face at an acute angle.

8. The image generator of claim 1 wherein:

the beam output face is substantially planar; and the second reflector is substantially planar and intersects the beam output face at an acute angle.

9. The image generator of claim 1 wherein the first beam input face comprises a first segment face aligned to receive the first beam of electromagnetic energy and a second segment face aligned to receive the second beam of electromagnetic energy, the second segment face being noncoplanar with the first segment face.

10. The image generator of claim 1 wherein the first beam input face comprises a first segment face aligned to receive the first beam of electromagnetic energy and a second segment face aligned to receive the second beam of electromagnetic energy, the second segment face being substantially coplanar with the first segment face.

11. A beam combiner, comprising:

a first beam input face aligned to receive first and second beams of electromagnetic energy respectively having a first and second wavelengths;

a beam output face;

a first reflector aligned to reflect the first received beam toward the beam output face;

a second reflector aligned to pass the first beam from the first reflector and to reflect the received second beam toward the beam output face;

wherein the first beam input face is aligned to receive a third beam of electromagnetic energy having a third wavelength;

a third reflector aligned to reflect the received third beam toward the beam output face;

wherein the third beam is operable to propagate from the first beam input face, through first regions of the first and second reflectors, to the third reflector, and through second regions of the first and second reflectors; and wherein the first beam is operable to propagate from the first beam input face, through a first region of the second reflector, to the first reflector, and through a second region of the second reflector.

12. An image generator, comprising:

beam combiner, comprising, a first section of transparent material having a beam input face and a beam output face, a second section of transparent material having a beam input face, a beam directing face adjacent to the beam output face of the first section and operable to reflect a second wavelength and to pass a first wavelength of electromagnetic radiation, and a beam output face, and a third section of transparent material having a beam input face, a beam directing face adjacent to the beam output face of the second section and operable to reflect a third wavelength of electromagnetic radiation and to pass the first and second wavelengths, and a beam output face;

a first beam source located a first distance from the beam input face of the second section and operable to direct toward the input face a first beam of electromagnetic radiation having the second wavelength; and a second beam source located a second distance from the beam input face of the third section and operable to direct toward the input face a second beam of electromagnetic radiation having the third wavelength, the second distance being different than the first distance.

13. The image generator of claim 12 wherein:

the first wavelength of electromagnetic radiation comprises red light;

the second wavelength of electromagnetic radiation comprises green light; and the third wavelength of electromagnetic radiation comprises blue light.

14. The image generator of claim 12 wherein the first section comprises a beam directing face operable to reflect the first wavelength of electromagnetic radiation.

15. The image generator of claim 12 wherein:

the beam input face and the beam output face of the first section intersect at an acute angle;

the beam input face and the beam output face of the second section intersect at an obtuse angle; and the beam input face and the beam output face of the third section intersect at a substantially right angle.

16. The image generator of claim 12 wherein:
the beam input face and the beam output face of the first section intersect at an obtuse angle;
the beam input face and the beam output face of the second section intersect at an obtuse angle; and
the beam input face and the beam output face of the third section intersect at a substantially right angle.

17. The image generator of claim 12 wherein:
the beam input face and the beam directing face of the second section intersect at an acute angle; and
the beam input face and the beam directing face of the third section intersect at an acute angle.

18. The image generator of claim 12 wherein:
the first section comprises a beam directing face operable to reflect the first wavelength of electromagnetic radiation;
the beam input face and the beam directing face of the first section intersect at an acute angle;
the beam input face and the beam directing face of the second section intersect at an acute angle; and
the beam input face and the beam directing face of the third section intersect at an acute angle.

19. The image generator of claim 12 wherein:
the beam directing face and the beam output face of the second section are substantially parallel; and
the beam directing face and the beam output face of the third section intersect at an acute angle.

20. The image generator of claim 12 wherein:
the first section comprises a beam directing face aligned to reflect the first wavelength of electromagnetic radiation;
the beam directing face and the beam output face of the first section are substantially parallel;
the beam directing face and the beam output face of the second section are substantially parallel; and
the beam directing face and the beam output face of the third section intersect at an acute angle.

21. The image generator of claim 12 wherein the height of the beam output face of the third section is substantially equal to the lengths of the beam input faces of the first, second, and third sections.

22. The image generator of claim 12 wherein the beam input faces of the second and third sections of transparent material are substantially coplanar.

23. The image generator of claim 12, further comprising a third beam source located a third distance from the beam input face of the first section and operable to direct toward the input face a third beam of electromagnetic radiation having the first wavelength.

24. The image generator of claim 23 wherein the third distance substantially equals the first distance.

25. An image generator, comprising:
a beam combiner, comprising;
  a first section of transparent material having a beam input face and having a first beam directing face operable to reflect a second wavelength and to pass a first wavelength of electromagnetic radiation,
  a second section of transparent material having a beam input face, a beam receiving face adjacent to the first beam directing face of the first section, and a beam directing face operable to reflect a third wavelength of electromagnetic radiation and to pass the first and second wavelengths, and
  a third section of transparent material having a beam input face, a beam receiving face adjacent to the beam directing face of the second section, and a beam output face;

a first beam source located a first distance from the beam input face of the third section and operable to direct toward the input face a first beam of electromagnetic radiation having the first wavelength;
a second beam source located a second distance from the beam input face of the first section and operable to direct toward the input face a second beam of electromagnetic radiation having the second wavelength, the second distance being different than the first distance; and
a third beam source located a third distance from the beam input face of the second section and operable to direct toward the input face a third beam of electromagnetic radiation having the third wavelength.

26. The image generator of claim 25 wherein:
the first wavelength of electromagnetic radiation comprises red light;
the second wavelength of electromagnetic radiation comprises green light; and
the third wavelength of electromagnetic radiation comprises blue light.

27. The image generator of claim 25 wherein the first section comprises a second beam directing face operable to reflect the first wavelength of electromagnetic radiation toward the first beam directing face.

28. The image generator of claim 25 wherein:
the beam input face and the first beam directing face of the first section intersect at an acute angle;
the beam input face and the beam directing face of the second section intersect at an obtuse angle; and
the beam input face and the beam output face of the third section intersect at a substantially right angle.

29. The image generator of claim 25 wherein:
the beam input face and the first beam directing face of the first section intersect at an obtuse angle;
the beam input face and the beam directing face of the second section intersect at an obtuse angle; and
the beam input face and the beam output face of the third section intersect at a substantially right angle.

30. The image generator of claim 25 wherein:
the beam input face and the beam receiving face of the second section intersect at an acute angle; and
the beam input face and the beam receiving face of the third section intersect at an acute angle.

31. The image generator of claim 25 wherein:
the first section comprises a second beam directing face operable to reflect the first wavelength of electromagnetic radiation;
the beam input face and the first beam directing face of the first section intersect at an obtuse angle;
the beam input face and the second beam directing face of the first section intersect at an acute angle;
the beam input face and the beam directing face of the second section intersect at an obtuse angle;
the beam input face and the beam receiving face of the second section intersect at an acute angle; and
the beam input face and the beam receiving face of the third section intersect at an acute angle.

32. The image generator of claim 25 wherein:
the beam receiving face and the beam directing face of the second section are substantially parallel; and
the beam receiving face and the beam output face of the third section intersect at an acute angle.

33. The image generator of claim 25 wherein:
the first section comprises a second beam directing face aligned to reflect the first wavelength of electromagnetic radiation;

the first and second beam directing faces are substantially parallel;

the beam receiving face and the beam directing face of the second section are substantially parallel; and the beam receiving face and the beam output face of the third section intersect at an acute angle.

34. The image generator of claim 25 wherein the height of the beam output face of the third section is substantially equal to the lengths of the beam input faces of the first, second, and third sections.

35. The image generator of claim 25 wherein the beam input faces of the second and third sections of transparent material are substantially coplanar.

36. An image-beam generator, comprising:

a beam source operable to generate the first, second, and third beams of light respectively having first, second, and third wavelengths;

a beam combiner, including, a beam input face aligned to receive the first, second, and third beams, a beam output face aligned to emanate an image beam that includes the first, second, and third beams, a first reflector aligned to reflect the first received beam toward the beam output face, a second reflector aligned to pass the first beam from the first reflector and to reflect the received second beam toward the beam output face in alignment with the first beam, and a third reflector aligned to pass the first and second beams from the first and second reflectors and to reflect the received third beam toward the beam output face in alignment with the first and second beams; and wherein the first, second, and third beams traverse respective paths from the beam source to the beam output face of the beam combiner, the paths having substantially the same optical length.

37. The image-beam generator of claim 36 wherein the first, second, and third beams respectively comprise red, green, and blue components of an image.

38. The image-beam generator of claim 36, further comprising:

wherein the beam-output face is aligned to emanate a composite beam that includes the first, second, and third beams; and an optical train aligned after the beam output face to generate the image beam from the composite beam.

39. The image-beam generator of claim 36 wherein the beam source comprises first, second, and third beam generators respectively operable to generate the first, second, and third beams.

40. The image beam generator of claim 36 wherein the beam input face comprises first, second, and third substantially coplanar segment faces aligned to respectively receive the first, second, and third beams.

41. The image beam generator of claim 36 wherein the beam input face comprises first, second, and third segment faces aligned to respectively receive the first, second, and third beams, one of the segment faces being noncoplanar with another one of the segment faces.

42. An image-beam generator, comprising:

a beam source operable to generate the first, second, and third beams of light respectively having first, second, and third wavelengths;

a beam combiner, including, a first beam input face aligned to receive the first beam;

a second beam input face aligned to receive the second and third beams, a beam output face aligned to emanate an image beam that includes the first, second, and third beams, a first reflector aligned to pass the first beam from the first beam input face and to reflect the received second beam toward the beam output face in alignment with the first beam, and a second reflector aligned to pass the first and second beams from the second reflector and to reflect the received third beam toward the beam output face in alignment with the first and second beams; and wherein the first, second, and third beams traverse respective paths from the beam source to the beam output face of the beam combiner, the paths having substantially the same optical length.

43. The image-beam generator of claim 42 wherein the first, second, and third beams respectively comprise red, green, and blue components of an image.

44. The image-beam generator of claim 42 wherein the first, second, and third beams respectively comprise red, green, and blue components of a pixel.

45. An image generator, comprising:

a beam source operable to generate the first, second, and third beams of light respectively having first, second, and third wavelengths;

a beam combiner, including, a beam input face aligned to receive the first, second, and third beams, a beam output face aligned to emanate an image beam that includes the first, second, and third beams, a first reflector aligned to reflect the first received beam toward the beam output face, a second reflector aligned to pass the first beam from the first reflector and to reflect the received second beam toward the beam output face in alignment with the first beam, and a third reflector aligned to pass the first and second beams from the first and second reflectors and to reflect the received third beam toward the beam output face in alignment with the first and second beams;

a scanner operable to generate an image with the image beam; and wherein the first, second, and third beams traverse respective paths from the beam source to the beam output face of the beam combiner, the oaths having substantially the same optical length.

46. The image generator of claim 45 wherein the scanner comprises a mirror operable to generate the image by sweeping the image beam across a display region.

47. The image generator of claim 45 wherein the scanner comprises a microelectromechanical scanner.

48. The image generator of claim 45 wherein the scanner is operable to generate the image on a display screen.

49. An image generator, comprising:

a beam source operable to generate the first, second, and third beams of light respectively having first, second, and third wavelengths;

a beam combiner, including, a first beam input face aligned to receive the first beam;

a second beam input face aligned to receive the second and third beams, a beam output face aligned to emanate an image beam that includes the first, second, and third beams, a first reflector aligned to pass the first beam from the first beam input face and to reflect the received second beam toward the beam output face in alignment with the first beam, and a second reflector aligned to pass the first and second beams from the second reflector and to reflect the received third beam toward the beam output face in alignment with the first and second beams;

a scanner operable to generate an image with the image beam; and wherein the first, second, and third beams traverse respective paths from the beam source to the beam output face of the beam combiner, the paths having substantially the same optical length.

50. A method, comprising:

directing a first beam of electromagnetic energy having a first wavelength from a first source, through a beam input face, and onto a first reflector;

directing the first beam through a second reflector and a beam output face with the first reflector such that the first beam traverses a first path between the first source and the beam output face; and directing a second beam of electromagnetic energy having a second wavelength from a second source, through the beam input face, and onto the second reflector; and directing the second beam through the beam output face with the second reflector in substantial alignment with the first beam and such that the second beam traverses a second path between the second source and the beam output face, the second path having substantially the same optical length as the first path.

51. The method of claim 50, further comprising directing a third beam of electromagnetic energy having a third wavelength through the first and second reflectors such that the third beam is substantially aligned with the first and second beams.

52. The method of claim 51, wherein directing the third beam comprises reflecting the third beam through the first and second reflectors with a third reflector.

53. The method of claim 50 wherein the first, second, and third beams respectively comprise green, blue, and red light.

54. A method, comprising:

directing a first beam of electromagnetic energy received by a beam input face and having a first wavelength through a first reflector with a second reflector;

directing a second beam of electromagnetic energy received by the beam input face and having a second wavelength with the first reflector wherein the first beam is substantially aligned with the second beam; and wherein directing the first beam further comprises;

directing the first beam through the first reflector, and reflecting the first beam back through the first reflector with the second reflector.

55. A method, comprising:

generating first, second, and third beams of light respectively having first, second, and third wavelengths;

directing the first beam through first and second reflectors;

directing the second beam through the second reflector with the first reflector wherein the directed second beam substantially coincides with the directed first beam;

directing the third beam with the second reflector wherein the directed third beam substantially coincides with the directed first and second beams;

wherein directing the first beam comprises causing the first beam to traverse a first optical path from a first starting location to a destination, the first optical path having a length;

directing the second beam comprises causing the second beam to traverse a second optical path from a second starting location to the destination, the second optical path having the same length; and directing the third beam comprises causing the third beam to traverse a third optical path from a third starting location to the destination, the third optical path having the same length.

56. The method of claim 55 wherein the first, second, and third beams respectively comprise red, green, and blue components of an image.

57. The method of claim 55, further comprising scanning the substantially coinciding first, second, and third beams to generate an image on a display.

58. The method of claim 55, further comprising scanning the coinciding first, second, and third beams into an eye to generate an image on a retina.

59. A beam combiner, comprising:

a first section of transparent material having a beam-input face and a beam-output face;

a second section of transparent material having a beam-input face, a beam directing face adjacent to the beam-output face of the first section and operable to reflect a second wavelength and to pass a first wavelength of electromagnetic radiation, and a beam-output face;

a third section of transparent material having a beam-input face, a beam directing face adjacent to the beam-output face of the second section and operable to reflect a third wavelength of electromagnetic radiation smaller than the first wavelength and to pass the first and second wavelengths, and a beam-output face;

a first beam source located a first distance from the beam-input face of the second section and operable to direct toward the input face a first beam of electromagnetic radiation having the second wavelength; and a second beam source located a second distance from the beam input face of the third section and operable to direct toward the input face a second beam of electromagnetic radiation having the third wavelength, the second distance being different than the first distance.

60. A beam combiner, comprising:

a first section of transparent material having a beam-input face and a beam-output face;

a second section of transparent material having a beam-input face, a beam directing face adjacent to the beam-output face of the first section and operable to reflect a second wavelength and to pass a first wavelength of electromagnetic radiation, and a beam-output face;

a third section of transparent material having a beam-input face, a beam directing face adjacent to the beam-output face of the second section and operable to reflect a third wavelength of electromagnetic radiation larger than the first wavelength and to pass the first and second wavelengths, and a beam-output face; and a first beam source located a first distance from the beam-input face of the second section and operable to direct toward the input face a first beam of electromagnetic radiation having the second wavelength; and a second beam source located a second distance from the beam-input face of the third section and operable to direct toward the input face a second beam of electromagnetic radiation having the third wavelength, the second distance being different than the first distance.

* * * * *

UNITED STATES PATENT AND TRADEMARK OFFICE
CERTIFICATE OF CORRECTION

| | | |
|---|---|---|
| PATENT NO. | : 7,167,315 B2 | Page 1 of 1 |
| APPLICATION NO. | : 10/828876 | |
| DATED | : January 23, 2007 | |
| INVENTOR(S) | : Mathew D. Watson and Mark Freeman | |

It is certified that error appears in the above-identified patent and that said Letters Patent is hereby corrected as shown below:

Column 20 line 48 change the word "oaths" to --paths--

Signed and Sealed this

First Day of May, 2007

JON W. DUDAS
*Director of the United States Patent and Trademark Office*